United States Patent
Rübbelke et al.

(10) Patent No.: US 9,713,896 B2
(45) Date of Patent: Jul. 25, 2017

(54) DIE DEVICE FOR AN EXTRUSION BLOW-MOULDING APPARATUS FOR PRODUCING A MULTILAYERED BLOWN FILM

(71) Applicant: Windmöller & Hölscher KG, Lengerich (DE)

(72) Inventors: Ingo Rübbelke, Geseke (DE); Markus Joppe, Mettingen (DE)

(73) Assignee: Windmöller & Hölscher KG, Lengerich (DE)

( * ) Notice: Subject to any disclaimer, the term of this patent is extended or adjusted under 35 U.S.C. 154(b) by 81 days.

(21) Appl. No.: 14/441,858

(22) PCT Filed: Aug. 16, 2013

(86) PCT No.: PCT/EP2013/067104
§ 371 (c)(1),
(2) Date: May 11, 2015

(87) PCT Pub. No.: WO2014/072090
PCT Pub. Date: May 15, 2014

(65) Prior Publication Data
US 2015/0266227 A1    Sep. 24, 2015

(30) Foreign Application Priority Data

Nov. 9, 2012   (DE) .................... 10 2012 110 788
Jan. 30, 2013  (DE) .................... 10 2013 100 938

(51) Int. Cl.
*B29C 47/86*    (2006.01)
*B29C 47/00*    (2006.01)
(Continued)

(52) U.S. Cl.
CPC ........ *B29C 47/866* (2013.01); *B29C 47/0026* (2013.01); *B29C 47/0057* (2013.01);
(Continued)

(58) Field of Classification Search
CPC .................................................. B29C 47/866
See application file for complete search history.

(56) References Cited

U.S. PATENT DOCUMENTS 3,920,365 A *  11/1975  Mules ................... B29C 47/165
                                                 425/141
4,430,698 A *   2/1984  Harris .................... B29C 47/92
                                                 318/561
(Continued)

FOREIGN PATENT DOCUMENTS

DE    2236163    2/1974
DE    2345049    3/1975
(Continued)

OTHER PUBLICATIONS

Partial machine translation of DE2236163 A1 dated Feb. 21, 1974 obtained from the espace website.*
(Continued)

*Primary Examiner* — Robert B Davis

(57) ABSTRACT

The invention relates to a die device (10) for an extrusion blow-molding apparatus (100) for producing a multilayered blown film (300), with an inner surface (310) and an outer surface (320), having a die orifice for the discharge of a multilayered material melt (300), wherein a temperature-control device (30) is arranged in order to set a different temperature on the two sides (310, 320) of the material melt (300). The invention also relates to a method for equalizing the differences in viscosity of the materials of the layers (350) by a controlled (40, 60) temperature setting.

13 Claims, 3 Drawing Sheets

(51) Int. Cl.

| | | |
|---|---|---|
| *B29C 47/06* | (2006.01) | |
| *B29C 47/26* | (2006.01) | |
| *B29C 47/88* | (2006.01) | |
| *B29C 47/92* | (2006.01) | |
| *B29C 47/14* | (2006.01) | |
| *B29C 55/28* | (2006.01) | |
| *B29L 7/00* | (2006.01) | |
| *B29L 9/00* | (2006.01) | |

(52) U.S. Cl.
CPC .......... *B29C 47/065* (2013.01); *B29C 47/145* (2013.01); *B29C 47/26* (2013.01); *B29C 47/883* (2013.01); *B29C 47/8835* (2013.01); *B29C 47/92* (2013.01); *B29C 55/28* (2013.01); *B29C 2947/922* (2013.01); *B29C 2947/92171* (2013.01); *B29C 2947/92209* (2013.01); *B29C 2947/92695* (2013.01); *B29C 2947/92704* (2013.01); *B29C 2947/92904* (2013.01); *B29L 2007/008* (2013.01); *B29L 2009/00* (2013.01)

(56) References Cited

U.S. PATENT DOCUMENTS

| | | | | |
|---|---|---|---|---|
| 4,488,861 A | * | 12/1984 | Reifenhauser | B29C 47/0026 264/209.7 |
| 5,106,562 A | * | 4/1992 | Blemberg | B29C 47/0007 264/173.13 |

FOREIGN PATENT DOCUMENTS

| | | |
|---|---|---|
| DE | 4236443 | 5/1994 |
| DE | 19823304 | 12/1999 |
| EP | 0096179 | 12/1983 |
| EP | 0595038 | 5/1994 |
| EP | 1584459 | 10/2005 |
| EP | 2351641 | 8/2011 |
| GB | 843320 | 8/1960 |
| GB | 2342310 | 4/2000 |
| JP | 56-005750 | 1/1981 |
| JP | 58-175913 | 11/1983 |
| WO | WO 87/06879 | 11/1987 |
| WO | WO 00/10790 | 3/2000 |
| WO | WO 2014/072090 | 5/2014 |

OTHER PUBLICATIONS

Partial machine translation of DE2345049 A1 dated Mar. 20, 1975 obtained from teh espace website.*
Mitteilung Gemaess Artikel 94(3) EPU [Communication Pursuant to Article 94(3) EPC] Dated Jun. 20, 2016 From the European Patent Office Re. Application No. 13750066.6 and Its Translation Into English.
International Search Report and the Written Opinion Dated Nov. 18, 2013 From the European Patent Office Re. Application No. PCT/EP2013/067104 and Its Translation of the Search Report in English.
Internationaler Vorlaufiger Bericht zur Patentierbarkeit [International Preliminary Report on Patentability] Dated Jan. 20, 2015 From the International Vorlautigen Pruefung Beauftragte Behoerde [International Preliminary Examining Authority] Re. Application No. PCT/EP2013/067104.
Pruefungsantrag [Request for Examination] Dated May 27, 2013 From the Deutsches Patent—und Markenamt [German Patent and Trademark Office] Re. Application No. 102013100938.7.

* cited by examiner

DIE DEVICE FOR AN EXTRUSION BLOW-MOULDING APPARATUS FOR PRODUCING A MULTILAYERED BLOWN FILM

RELATED APPLICATIONS

This application is a National Phase of PCT Patent Application No. PCT/EP2013/067104 having International filing date of Aug. 16, 2013, which claims the benefit of priority of German Patent Applications Nos. 10 2013 100 938.7 filed on Jan. 30, 2013, and 10 2012 110 788.2 filed on Nov. 9, 2012. The contents of the above applications are all incorporated by reference as if fully set forth herein in their entirety.

FIELD AND BACKGROUND OF THE INVENTION

The present invention relates to a die device for a blow-moulding apparatus for the production of a multi layered blown film, a blow-moulding apparatus for the production of a multi layered blown film and a method for temperature controlling a multi layered material melt during the production of a multi layered blown film.

It is known that for the production of blown films blow-moulding apparatus are used. Thereby, commonly a material melt is dispensed through a die orifice and subsequently cooled down in blowing form. The cooling commonly occurs from the outer surface and/or the inner surface through an air cooling device. In this manner not only single layered but also multi layered blown films can be provided. With the production of multi layered blown films die orifices are configured for the outlet of a multi layered material melt. This means that through the die orifice different materials in the melt are dispended layerwise towards one another which are already merged within the blown head comprising the die orifice. The document EP 1 055 504 discloses such a blown head. Thereby, the corresponding layers of the material melt correlate with the corresponding layers subsequently to the cooling down, namely the layers of the blown film. The multi layered blown film will correspondingly comprise an inner surface and an outer surface between which the layers of the multi layered blown film extend. Accordingly, the material melt comprises two sides which correspond with the subsequently produced inner surface and outer surface of the blown film and include the layers according to the material melt.

With known die devices or with known blow-moulding apparatus it has to be proceed with great accuracy during the production of multi layered blown films. During the outlet from the die orifice the multi layered material melt will comprise a temperature in which all materials of all layers are available in a melted state. Since however normally each layer comprises a different material type the different layers also comprise different physical properties. Thereby a particularly important physical property is the viscosity. Thereby, each material, which comprises a different temperature viscosity curve, will also comprise a different viscosity during the melting temperature at the outlet through the die orifice. With other words, at the point of time of the outlet from the die orifice a distribution of the different viscosities exists over the width of the material melt. This viscosity distribution leads to different flexibilities of the single layers, so that by the conveyance away from the die orifice a deflection of the leaked material melt to the inside, meaning in direction of the to be performed inner surface, or to the outside, meaning in the direction of the to be built outer surface, occurs. This concavity to the inside or to the outside produces additional tension within the film. Thereby, by viscosity differences this deflection can be as great that a contact between the escaping material melt and parts of the die device particularly at the edge of the die orifice or the cooling devices occurs. Such a contact necessarily leads to the adhesion of the material melt at this position. An adhesion however conflicts with the continuous outlet of the material melt so that at this position a hole or even a crack of the material melt occurs. The subsequently cooled down material melt or the thereby developed blown film will accordingly rip off, so that a stop of the complete manufactory process becomes necessary. This leads to a material waste and to cost intensive operating life.

SUMMARY OF THE INVENTION

It is the object of the present invention to at least partially avoid the previously described disadvantages. Particularly, it is the object of the present invention to provide a die device, a blow-moulding apparatus and a method for temperature controlling a multi layered material melt during the production of a multi layered blown film, which in a cost-efficient and simple manner reduces the risk of a film rupture or the damage of the multi layered film.

The previous object is solved by the described herein die device, the described herein blow-moulding apparatus and the described herein method. Further features and details of the invention result from the depended claims, the description and the drawings. Thereby, features and details which are described in connection with the die device according to the invention thereby naturally also apply in connection with the blow-moulding apparatus according to the invention and the method according to the invention and vice versa, so that according to the disclosure of the single aspects of the invention it can be always reciprocally related to.

The die device according to the invention for a blow-moulding apparatus serves for the production of a multi layered blown film with an inner surface and an outer surface. Such a die device comprises a die orifice for the outlet of a multi layered material melt. A die device according to the invention is characterized in that a temperature control device is assembled in order to differentially temperature control both sides of the material melt which correspond with the inner surface and the outer surface of the blown film.

A die device according to the invention also serves for the outlet of the multi layered material melt through the die orifice. Thereby, the single layers of the material melt already generate the to be produced layers of the blown film. The single material layers of the material melt thereby preferably comprise at least partially different materials. At a common melting temperature of the whole multi layered material melt the different materials lead to the viscosity differences between the single layers described in the introduction.

According to the invention now a compensation of this viscosity differences occurs. Thereby, it was surprisingly recognized that a temperature variation for the elimination of the demolition probability can be advantageous in a different manner for both sides of the material melt. This depends particularly on the different dependences of the viscosity from the temperature for the single materials of the layers of the multi layered material melt. Thereby, each layer can be temperature controlled in a different manner, particularly a respective layer relating to the outer surface and to the inner surface.

By temperature controlling of both sides particularly an exertion of influence on the temperature of the corresponding lateral materials of the material melt has to be understood. Naturally, thereby not only the lateral areas of the material melt are influenced but also a temperature influence of the corresponding volume section of the side of the material melt by heat conduction is produced. With other words, from both sides of the material melt different temperature controlling is conducted, so that for example one of both sides can comprise a cooler temperature than the other side of both sides. Accordingly, an influence from both sides of the temperature can occur in a different manner in order to compensate corresponding viscosity differences.

The compensation occurs in a way that a particularly high viscose material layer is heated and the particularly low viscose material layer is cooled down. Accordingly by the different treatments of both sides of the material melt a difference of the single viscosities described in the introduction can at least be partially compensated.

By the previously described compensation an influence of the material properties of the material melt is generated, so that the deflection does not occur or does not occur that strong. Thereby, also with high viscosity differences of multi layered material melts a contact of the material melt after the outlet with the die orifice of the die device or other components like cooling devices can be avoided. This significantly reduces the probability of the rupture and the stop of the procedure.

By a temperature controlling according to the present invention an active and also a passive temperature controlling has to be understood. Thereby, for example only the side corresponding to the inner surface can be cooled down or heated while the opposing side which corresponds with the outer surface is not temperature controlled. By this influence a different temperature of both sides can be allocated to the material melt which leads to the compensation of the viscosity differences according to the invention.

It can be an advantage when with the die device according to the invention the temperature control device is configured in order to differentially cool down and/or differentially heat the material melt from both sides. Particularly, the cooling down or heating is combined with one another so that depending on the current recipe or the current layer composition of the multi layered material melt one and the same die device can be applied. This increases the flexibility of the application of a die device according to the invention. Likewise here the object is again the differentiation of the temperature of both sides and thereby at the corresponding lateral volume sections of the escaping multi layered material melt. Naturally, the cooling down and/or the heating can be generated by the same temperature control means or also by different temperature control means. Thereby, for example via a cooling fluid in form of a cooling liquid or a cooling gas the cooling capacity can be provided while the heating effect can be achieved via an electric heating unit as a temperature control means.

It is an advantage when with the die device according to the invention the temperature control device is configured for an active temperature controlling of both sides of the material melt. By an active temperature controlling thereby the active influence through the application of a heat quantity or by the conveyance of a heat quantity has to be understood. The active temperature controlling thereby enables a targeted control or by providing of corresponding input parameters also a targeted regulation of the respective temperature of the corresponding side of the material melt.

It is likewise an advantage when with a die device according to the invention the temperature control device comprises temperature control means, which are configured for a constant or a mainly constant temperature controlling of the respective side of the material melt in the circumferential direction. Thereby, the temperature control means are particularly evenly spread over the circumference of the die orifice. Temperature control means can for example be fluid temperature control means in form of fluid channels. Likewise other configuration forms, for example electric heating wires, can be regarded as temperature control means within the scope of the present invention. Thereby, a constant temperature controlling occurs only on each side in the circumferential direction. Both sides of the material melt naturally differ from one another concerning the respective desired temperature control temperature. Thereby, also a sector-wise assembly of the temperature control means can occur in order to be able to also in circumferential direction generate a pattern of the respective material layer temperatures.

Likewise it is an advantage when with the die device according to the invention the die orifice is configured as an annular gap in order to act as an outlet for the material melt. An annular gap which particularly comprises a circularity provides a particularly cost efficient and also space saving construction. Also a corresponding further processing of the produced blown film can occur cost efficiently and in a simple manner. Particularly, the cooling down can be provided with the help of an internal and/or external cooling device with a help of cooling air. Subsequent cooling devices likewise internal and/or also external can be transported with a die device according to the invention in radial direction closer to the respective material of the material melt since the risk of deflection and correspondingly the risk of a contact with a cooling device is reduced.

Likewise it can be an advantage when with the die device according to the invention at least one temperature sensor is intended for the determination of the temperature of at least one side of the material melt. This temperature sensor can be assembled anterior to the influence through the temperature control device and also posterior to the influence through the temperature control device. With an assembly of the temperature sensor posterior to the influence through the temperature control device even a control path can be provided in order to relate the result of the temperature control to the actual temperature control performance. By this regulation the effect according to the invention of the different temperature controls of both sides of the material melt can be achieved even more targeted and precise. The temperature sensor technology can be embedded within the die device itself but can also occur separately. Thereby, for example temperature sensing devices or contactless measuring methods in form of radar sensor technologies, ultra sound sensor technologies or infrared measurements are possible.

A die device according to the invention can be further configured in a way that the temperature control device, particularly the temperature control means, are assembled in or within the area of a die lip. A die lip is the section about the die orifice. In this area the influence impact of the temperature control is at greatest since in this area the material melt occurs with the outlet temperature. Here the most efficient effect according to the invention of the influence of the temperatures of both sides of the material melt can be achieved.

The die device according to the invention can further be improved in a way that a control device is intended for the regulation and/or the control of the temperature control device. Particularly, this control device is configured for the performance of the method according to the invention like it is subsequently described in detail. Accordingly, a die device according to the invention of this embodiment provides the same advantages like subsequently described in detail regarding the method according to the invention.

Likewise subject matter of the present invention is a blow-moulding device for the generation of a multi layered blown film with an inner surface and an outer surface comprising at least a die device according to the invention. Accordingly a blow-moulding apparatus according to the invention provides the same advantages like they are already described in detail regarding the die device according to the invention.

A further subject matter of the present invention is a method for temperature controlling of a multi layered material melt with the production of a multi layered blown film with an inner surface and an outer surface. The method according to the invention thereby comprises the following steps:

Pretending the temperature viscosity curve of at least two layer materials of the material melt, Temperature controlling of both sides of the material melt which correspond with the inner surface and the outer surface with different temperatures.

With multi layered material melts thereby particularly the specification of such layer materials is meaningful which comprise the greatest thickness. A temperature viscosity curve is thereby the representation of the viscosity during the process of the temperature. This both temperature viscosity curves can be compared with one another so that by different temperature controls the respective side of the material melt produces a different temperature of the respective corresponding material layer. The different temperatures lead in connection with the respective temperature viscosity curve to different viscosities so that a compensation or adjustment of the described viscosity differences can occur. Accordingly, a method according to the invention provides the same advantages like previously described in detail corresponding to the die device according to the invention or corresponding to the blow-moulding apparatus according to the invention.

A method according to the invention can be further improved in a way that with the temperature controlling of both sides of the material melt a compensation or mainly a compensation of the viscosity differences of the at least two layer materials of the material melt can be produced. By a compensation thereby an adjustment of both viscosities has to be understood. Thereby, by a reduction of a high viscosity and at the same time an increase of the lower viscosity by an alteration of the temperatures a compensation of these viscosities can be achieved. The smaller the viscosity differences of the single layers are towards one another the lower the effect of the compensation will turn out. Accordingly, a compensation of the viscosity differences is of a great advantage for the method according to the invention.

A method according to the invention is improved in an advantageous manner so that a maximum standard value is pretended as an allowable deviation of the viscosities of the at least two layer materials of the material melt. This maximum standard value correlates for example with the geometric correlation to installed equipment of the blow-moulding apparatus. Thereby, so to say a free space can be pretended which is provided for the maximum deflection of the material melt. From this maximum deflection a maximum viscosity difference can be calculated which provides the maximum standard value of the allowable deflection in a method performance according to the invention.

BRIEF DESCRIPTION OF THE SEVERAL VIEWS OF THE DRAWINGS

Further advantages, features and details of the invention result from the subsequent description, in which with reference to the drawings, embodiments of the description are described in detail. Thereby, the features described in the claims and in the description can be essential for the invention single for themselves or in any combination. It is schematically shown:

DESCRIPTION OF SPECIFIC EMBODIMENTS OF THE INVENTION

Figure 1:
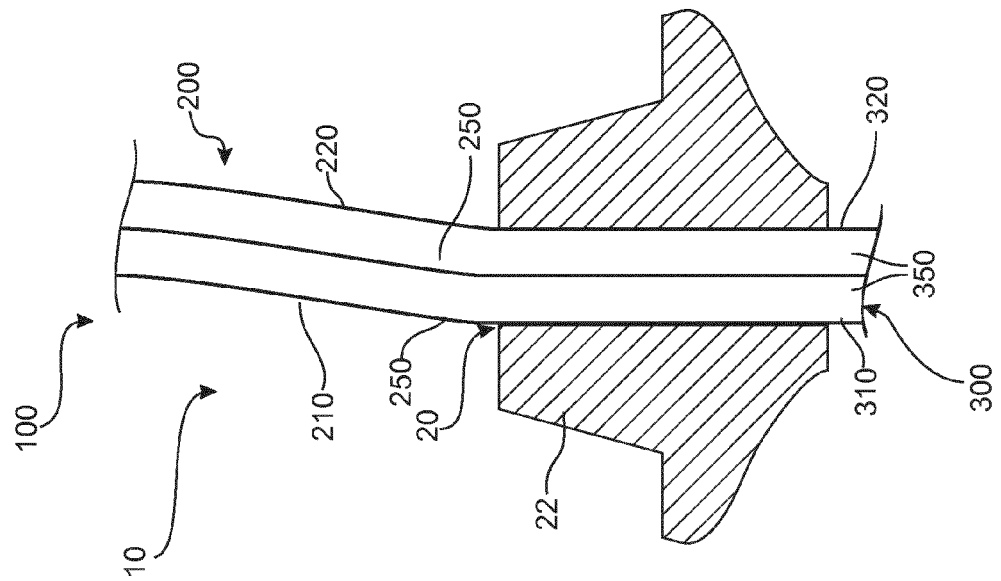
FIG. 1 the configuration of a deflection of the material melt with the state of the art, FIG. 2 a reduced deflection with a die device according to the invention, FIG. 3 an embodiment of the die device according to the invention, FIG. 4 another embodiment of a die device according to the invention and FIG. 5 a schematic representation of different temperature viscosity curves.
Figure 2:
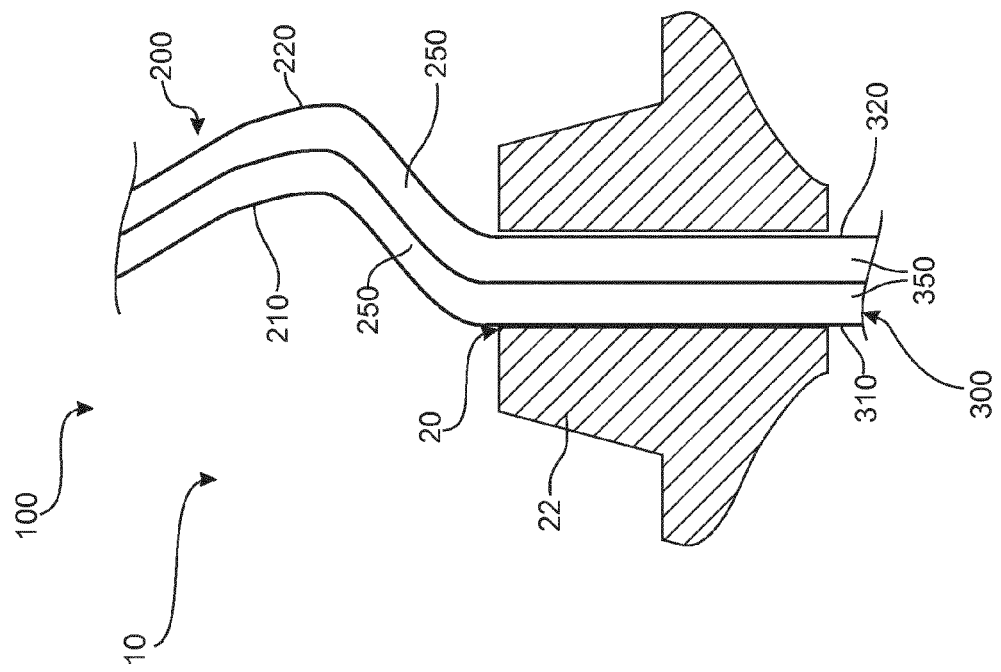

The FIGS. 1 and 2 show different embodiments of die devices 10. In FIG. 1 a state of the art embodiment is shown while FIG. 2 shows a die device 10 according to the present invention and correspondingly also shows a blow-moulding apparatus 100. With a die device 10 a die orifice 20 is assembled at the edge of the die lip 22. In both cases according to FIG. 1 and FIG. 2 a two layered material melt 300 is conveyed through the die orifice 20 with two layers 350. Thereby, this material melt 300 comprises two layers 310 and 320. All this serves for the production of a multi layered blown film 200 with the layers 250 and the inner surface 210 and the outer surface 220. The first side 310 of the material melt 300 thereby correlates with the internal surface 210 and the second side 320 with the outer surface 220.

In FIG. 1 it can be recognized that different viscosities of both layers 350 lead to a significant deflection during the outlet from the die orifice 20. This deflection can lead to the contact with other installations like for example the cooling device or even directly with the outlet at the die orifice 20. This can lead to a rupture or a defect of the blown film 20 or to a complete stop situation for the method. In FIG. 2 a significantly reduced deflection of the material melt 300 is shown so that a rupture of the blown film 200 can be avoided.

Figure 3:
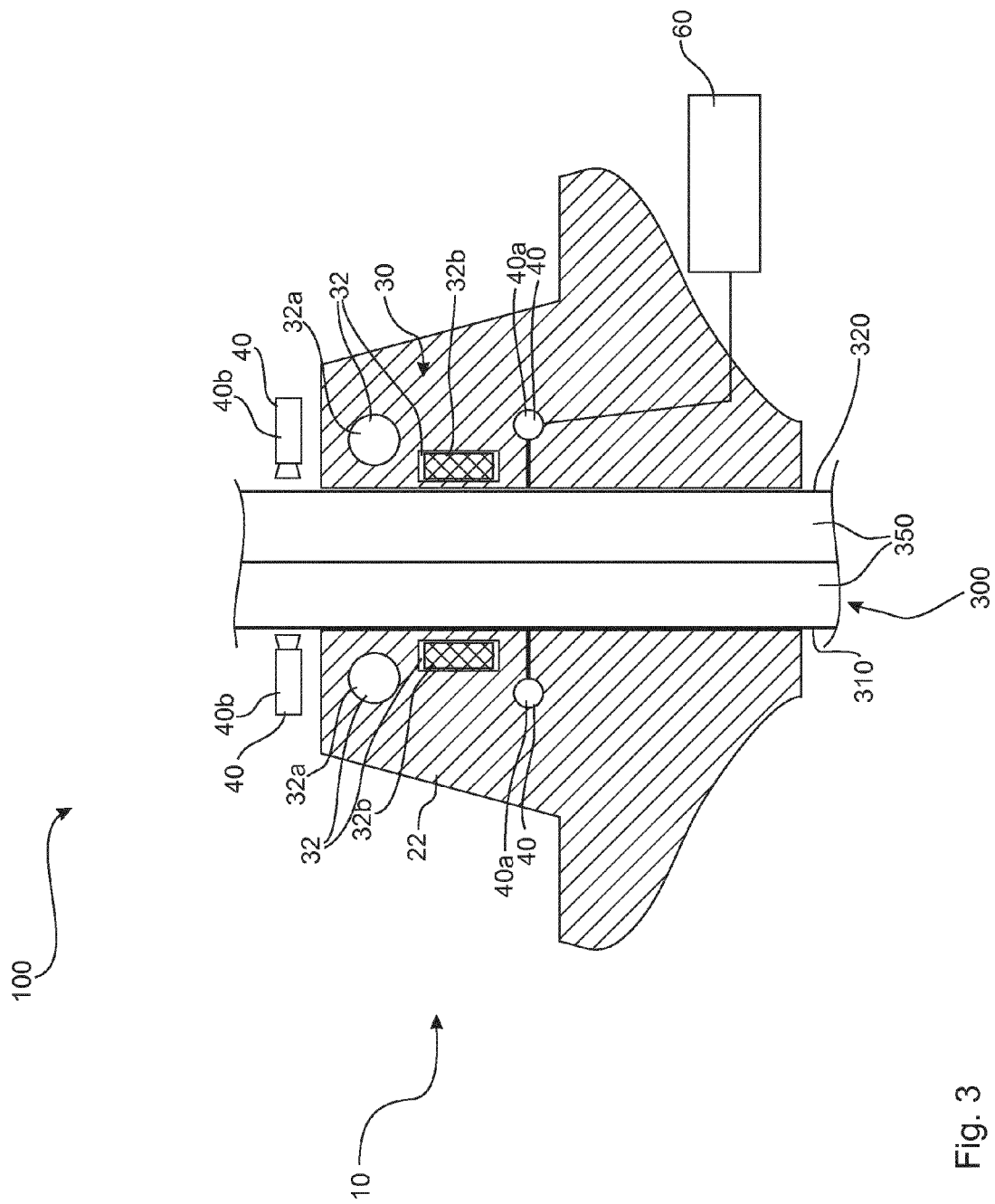

FIG. 3 shows an embodiment of a blow-moulding apparatus 100 according to the invention and a corresponding die device 10 according to the invention. Here it is likewise shown, how the previously described effect of the reduced deflection is achieved. Thus here a temperature control device 30 with temperature control means 32 is intended. The temperature control means are configured as a fluid channel 32a and as electric heating elements 32b. These serve for the temperature controlling of both sides 310 and 320 of the material melt 300 with different temperatures. The left temperature control means 32 can be separately controlled or separately regulated to the right temperature control means 32.

In FIG. 3 further possibilities of the temperature sensor technology with the help of temperature sensors 40 are shown. Thus, before the influence through the temperature control means 32 with the help of temperature detectors 40a a determination of the actual temperature of each side 310 and 320 of the material melt 300 can occur. Likewise, a result monitoring subsequent with the outlet of the die orifice 20 and thereby a control path for the regulation of the temperature control means 32 can be provided for example via infrared sensors 40b as temperature sensors 40.

Figure 4:
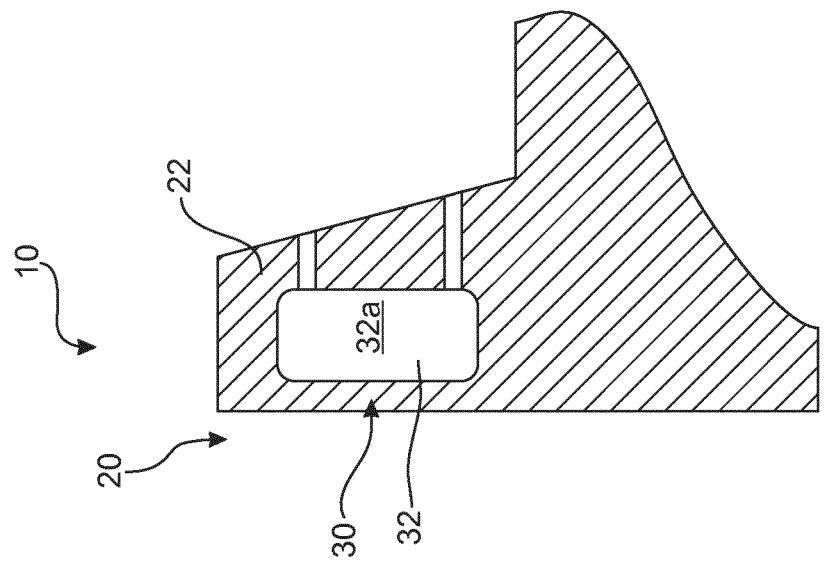

FIG. 4 shows a particularly simple embodiment of a die device 10 according to the invention. Here only the right part of the die lip 22 is shown in which a relatively great fluid channel 32a is intended as a temperature control means 32 of the temperature control device 30.

Figure 5:
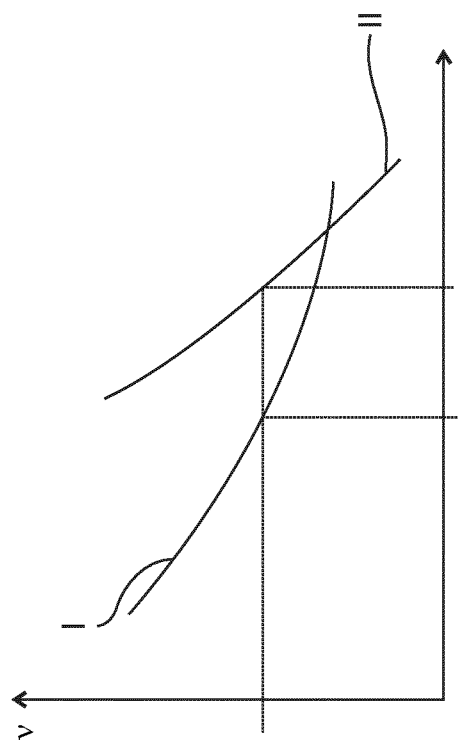

FIG. 5 schematically shows two courses of temperature viscosity curves for a first material I and a second material II. With a dotted line the compensation of the viscosity is shown. With the same viscosity two different temperatures can be allocated by which this common equal viscosity is achieved. This leads to the fact that by an influence according to the invention and different temperature controls to different target temperatures a compensation of the respective viscosity to a common viscosity can occur.

The previous description of the embodiments describes the present invention only within the scope of examples. Naturally, single features of the embodiments if technically meaningful can be freely combined with one another without leaving the scope of the present invention.

REFERENCE LIST

10 Die device
20 Die orifice
22 Die lip
30 Temperature control device
32 Temperature control means
32a Fluid channel
32b Electric heating element
40 Temperature sensor
40a Temperature detector
40b Infrared sensor
50 Control device
100 Blow-moulding apparatus
200 Blown film
210 Inner surface
220 Outer surface
250 Layer of the blown film
300 Material melt
310 Side of the material melt
320 Side of the material melt
350 Layer of the material melt
T Temperature
v Viscosity
I First material
II Second material

What is claimed is:

1. A Die device for a blow-moulding apparatus for the production of a multi layered blown film with an inner surface and an outer surface, comprising a die orifice for the outlet of a multi layered material melt,
wherein a temperature control device is assembled in order to temperature control inner and outer sides of the material melt differently, which correspond with the inner surface and the outer surface of the blown film,
wherein the temperature control device is assembled in a die lip about the die orifice;
wherein the temperature control device is assembled in or in the area of a die lip;
wherein the temperature control device comprises a fluid channel and electric heating elements;
wherein the fluid channel is configured for controlling the temperature of the inner side of the material melt or the outer side of the material melt;
wherein the electric heating elements are operated to apply the inner side of the material melt and the outer side of the material melt with different temperatures;
wherein the temperature of the inner side of the material melt and the temperature of the outer side of the material melt are separately controlled or regulated.

2. The Die device according to claim 1, wherein the temperature control device is configured in order to differently cool and/or differently heat the material melt from both sides.

3. The Die device according to claim 1, wherein the temperature control device is configured for an active temperature controlling of both sides of the material melt.

4. The Die device according to claim 1, wherein the temperature control device comprises temperature control means which are configured for constant or mainly constant temperature controlling of the respective side of the material melt in circumferential direction, wherein the temperature control means are spread over the circumference of the die orifice.

5. The Die device according to claim 1, wherein the die orifice is configured as an annular gap in order to act as an outlet for the material melt.

6. The Die device according to claim 1, wherein at least a temperature sensor is intended for the determination of the temperature of at least one side of the material melt.

7. The Die device according to claim 1, wherein the temperature control means is assembled in or in the area of the die lip.

8. The Die device according to claim 1, wherein a control device is intended at least for the regulation or for the control of the temperature control device.

9. Blow-moulding apparatus for the production of a multi layered blown film with an inner surface and an outer surface comprising at least a die device with the features of claim 1.

10. A method for temperature controlling a multi layered material melt with a production of a multi layered blown film with an inner surface and an outer surface, comprising the following:
representing by temperature viscosity curves a viscosity of at least two coating materials of the material melt during a process of a temperature control,
using a temperature control device having a fluid channel and electric heating elements and assembled in or in the area of a die lip for controlling both sides of the material melt with different temperatures which correspond with an inner surface and an outer surface;
wherein with the temperature controlling of both sides of the material melt an adjustment or mainly an adjustment of the viscosity differences of the at least two coating materials of the material melt is generated according to said temperature viscosity curves;
wherein the fluid channel is configured for controlling the temperature of the inner side of the material melt or the outer side of the material melt;
wherein the electric heating elements are operated to apply the inner side of the material melt and the outer side of the material melt with different temperatures;

wherein the temperature of the inner side of the material melt and the temperature of the outer side of the material melt are separately controlled or regulated.

11. The Method according to claim 10, wherein a maximum standard value is set as an admissible variation of the viscosity of at least two coating materials of the material melt.

12. The Die device according to claim 4, wherein temperature control means are spread evenly over the circumference of the die orifice.

13. The Die device according to claim 8, wherein said control device is configured to control the temperature of both sides of the material melt with different temperatures which correspond with an inner surface and an outer surface;
wherein with the temperature control of both sides of the material melt an adjustment or mainly an adjustment of the viscosity differences of the at least two coating materials of the material melt is generated.

\* \* \* \* \*